(12) United States Patent
Trautner et al.

(10) Patent No.: US 8,228,775 B2
(45) Date of Patent: Jul. 24, 2012

(54) HOLOGRAPHIC RECORDING MEDIUM HAVING A TRACK PITCH SMALLER THAN A DISTANCE BETWEEN ADJACENT HOLOGRAMS

(75) Inventors: Heiko Trautner, Unterkirnach (DE); Hartmut Richter, Villingen-Schwenningen (DE); Dietmar Braeuer, Villingen-Schwenningen (DE); Christof Ballweg, Villingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1241 days.

(21) Appl. No.: 11/884,998

(22) PCT Filed: Feb. 21, 2006

(86) PCT No.: PCT/EP2006/060136
§ 371 (c)(1),
(2), (4) Date: Aug. 24, 2007

(87) PCT Pub. No.: WO2006/094898
PCT Pub. Date: Sep. 14, 2006

(65) Prior Publication Data
US 2008/0137494 A1    Jun. 12, 2008

(30) Foreign Application Priority Data
Mar. 7, 2005  (EP) .................................. 05101747

(51) Int. Cl.
*G11B 7/00* (2006.01)
(52) U.S. Cl. ...................................... 369/103; 369/275.4
(58) Field of Classification Search .................. 369/103, 369/44.26, 275.4, 275.3, 275.2, 275.1; 359/1, 359/2, 3, 4, 5, 6, 7, 8; 430/1, 2
See application file for complete search history.

(56) References Cited

U.S. PATENT DOCUMENTS

| | | | |
|---|---|---|---|
| 5,111,445 A * | 5/1992 | Psaltis et al. ................... | 369/103 |
| 6,574,174 B1 | 6/2003 | Amble et al. | |
| 7,130,092 B1 * | 10/2006 | Horimai .................... | 369/109.01 |
| 8,000,205 B2 * | 8/2011 | Hori et al. ...................... | 369/103 |
| 2002/0114027 A1 | 8/2002 | Horimai | |
| 2004/0001400 A1 * | 1/2004 | Amble et al. ............... | 369/44.26 |
| 2004/0085599 A1 * | 5/2004 | Kim ................................ | 359/35 |
| 2004/0145994 A1 * | 7/2004 | Tsukagoshi ................... | 369/103 |
| 2004/0165518 A1 | 8/2004 | Horimai et al. | |

(Continued)

FOREIGN PATENT DOCUMENTS

CN    1540458    10/2004

(Continued)

OTHER PUBLICATIONS

Search Report Dated Aug. 30, 2006.

*Primary Examiner* — Tan X Dinh
(74) *Attorney, Agent, or Firm* — Tutunjian & Bitetto, P.C.

(57) ABSTRACT

The present invention relates to a holographic recording medium adapted to store additional information for the recorded holograms, and to a holographic pickup for a holographic storage system for use with the holographic recording medium. According to the invention, the holographic recording medium has a holographic layer for storing holograms and a servo layer for positioning a light beam for reading and/or recording of a hologram relative to the holographic recording medium, wherein the servo layer is recordable or rewritable. A holographic pickup for use with such a holographic recording medium includes a light source for recording additional data in the servo layer of the holographic recording medium.

11 Claims, 3 Drawing Sheets

U.S. PATENT DOCUMENTS

| | | |
|---|---|---|
| 2004/0212859 A1 | 10/2004 | Tsukagoshi |
| 2005/0002311 A1 | 1/2005 | Ichihara et al. |
| 2005/0018260 A1 | 1/2005 | Hirao et al. |
| 2005/0157613 A1* | 7/2005 | Ogasawara et al. ........ 369/44.26 |
| 2007/0230292 A1* | 10/2007 | Yamamoto et al. ........ 369/44.26 |
| 2008/0037083 A1* | 2/2008 | Ogasawara ....................... 359/3 |
| 2009/0262628 A1* | 10/2009 | Koda et al. .................... 369/103 |
| 2009/0316239 A1* | 12/2009 | Okada et al. ...................... 359/9 |
| 2011/0096653 A1* | 4/2011 | Mizuyama et al. ........... 369/103 |

FOREIGN PATENT DOCUMENTS

| | | |
|---|---|---|
| EP | 1 310 952 A2 | 5/2003 |
| WO | WO2005/093725 A1 | 6/2005 |
| WO | WO2005086148 | 9/2005 |

* cited by examiner

HOLOGRAPHIC RECORDING MEDIUM HAVING A TRACK PITCH SMALLER THAN A DISTANCE BETWEEN ADJACENT HOLOGRAMS

CROSS-REFERENCE TO RELATED APPLICATIONS

This application claims the benefit, under 35 U.S.C. §365 of International Application PCT/EP2006/060136, filed Feb. 21, 2006, which was published in accordance with PCT Article 21(2) on Sep. 14, 2006 in English and which claims the benefit of European patent application No. 05101747.3, filed Mar. 7, 2005.

The present invention relates to a holographic recording medium, and more specifically to a holographic disk medium adapted to store additional information for the recorded holograms, and to a holographic pickup for a holographic storage system for use with the holographic recording medium.

BACKGROUND OF THE INVENTION

1) Field of the invention

In holographic data storage digital data are stored by recording the interference pattern produced by the superposition of two coherent laser beams. One advantage of holographic data storage is the possibility to store multiple data in the same volume, e.g. by changing the angle between the two beams or the wavelength, by using phase-coded reference beams, etc. To reliably retrieve the information, the physical properties of the holographic storage system during readout have to be the same as during recording. This means that the reference beam needs to have the same wavelength, the same wavefront error, the same beam profile, the same phase code if phase coding multiplexing is used, etc. Furthermore, the hologram has to be illuminated under the same angle and at the same position. For a precise controlling or pre-setting of the readout system, easily accessible position, address or content specific information is preferably stored directly on the holographic recording medium, favorably for each individual hologram. For example, in WO0157859 Szarvas et al. propose to store special identifying marks in addition to the user data marks in each recorded hologram. However, in this case any information to be stored in the moment of recording has to be stored in a hologram, which in turn is only readable with correct beam settings.

2) Description of Related Art

In EP1310952 Horimai et al. disclose the concept of having a substrate similar to a DVD (Digital Versatile Disk) as a guiding structure underneath a holographic disk medium. In this case a servo light beam is focused onto the holographic disk medium with the same objective lens as the holographic beam, i.e. the light beam used for holographic recording or readout. When the holographic and the servo beams are fixed relatively to each other, the servo beam can act as a reference for the beam used for holographic recording. The servo beam is focused onto the guiding structure, whereas the holographic beam is focused as appropriate for the chosen holographic recording process. Though this approach facilitates the retrieval of recorded holograms, information about the physical properties of the holographic storage system during recording is still not available.

U.S. Pat. No. 6,574,174 discloses a holographic recording medium with a holographic layer and a servo layer for positioning a light beam for reading and/or recording a hologram relative to the holographic recording medium. Apart from servo data, the servo layer also includes additional data.

It is an object of the invention to propose a holographic recording medium which allows to record easily accessible additional data apart from the holograms.

SUMMARY OF THE INVENTION

According to the invention, this object is achieved by a holographic recording medium with a holographic layer for storing holograms and a servo layer for positioning a light beam for reading and/or recording of a hologram relative to the holographic recording medium, wherein the servo layer is recordable or rewritable. In this way additional data can be recorded in the servo layer. The additional data is, for example, recorded in the servo layer during manufacturing of the holographic recording medium, e.g. in case of a prerecorded medium, or at the time of recording a hologram in the holographic recording medium. The recordable or rewritable servo layer advantageously includes prerecorded additional data. The prerecorded additional data in the servo layer are already accessible before the data are recorded, which allows to store information necessary or at least helpful for adjusting the holographic storage system to specific readout conditions of a hologram together with the hologram. Advantageously, the holographic recording medium is a holographic disk. However, the invention is likewise applicable to other types of holographic recording media, e.g. a holographic storage card etc.

Preferably the holographic layer is essentially insensitive to light with the wavelength used for the servo layer. For example, red light can be employed for a DVD-like servo layer. If the holographic layer is not sensitive to the wavelength of the servo light beam, it is not influenced by the light beam writing or reading information to or from the servo layer.

Favorably, the additional data is recorded in the form of data marks in the servo layer, e.g. pits and lands. In principle any type of mark leading to a detectable modification of the reflected servo light beam can be used. Advantageously the data marks are run-length coded. Of course, other codes can also be used. The servo layer favorably includes prerecorded marks for triggering reading and/or recording of a hologram.

Preferably the servo layer is a pre-grooved layer having tracks with track pitch smaller than or essentially equal to the distance between adjacent holograms.

It is a further object of the invention to propose a holographic pickup for a holographic storage system, which is capable of retrieving the additional data recorded in a holographic recording medium according to the invention.

This object is achieved by a holographic pickup for a holographic storage system including:
  a light source for generating at least a first light beam for reading a hologram recorded in the holographic recording medium,
  a light source for generating a servo light beam, which interacts with a servo layer of the holographic recording medium for positioning the first light beam relative to the holographic recording medium, and
  a detector for retrieving additional data recorded in the servo layer of the holographic recording medium, and
  a light source for recording additional data in the servo layer of the holographic recording medium.

Such a holographic pickup is capable of reading and recording additional data in the servo layer in addition to reading the recorded holograms. If the holographic pickup further includes a light source for generating a second light beam for recording a hologram in the holographic recording medium, this pickup can be used for holographic recording as well. Preferably the servo light beam is used for reading the additional data recorded in the servo layer. As a detector needs to be provided for the reflected servo light beam anyway for servo control, this detector is advantageously adapted to detect the additional data. The easiest solution for recording the additional data is to use a high power laser diode for generating the servo light beam. This laser diode can then also be used for recording data in the servo layer.

Advantageously, the holographic pickup further includes a controller for controlling the relative position of the servo light beam and the recording and/or reading light beam. In this way the relative position of the servo light beam and the recording and/or reading light beam can be adjusted such that the holograms are retrieved with the best possible quality. An optimum readout signal is achieved if the light beams for servoing and hologram readout are exactly at the same position relatively to each other during reading as during recording. When different recording media are to be read by different holographic storage systems, this condition is achieved with a mechanism, which allows to position the beams precisely relative to each other. An automatic control loop can be realized by reading holograms, e.g. in a special area, and adjusting the two beams until the holograms are of best quality, detectable e.g. by the error rate.

Preferably a holographic storage system includes a holographic pickup according to the invention.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRITION

Figure 1:
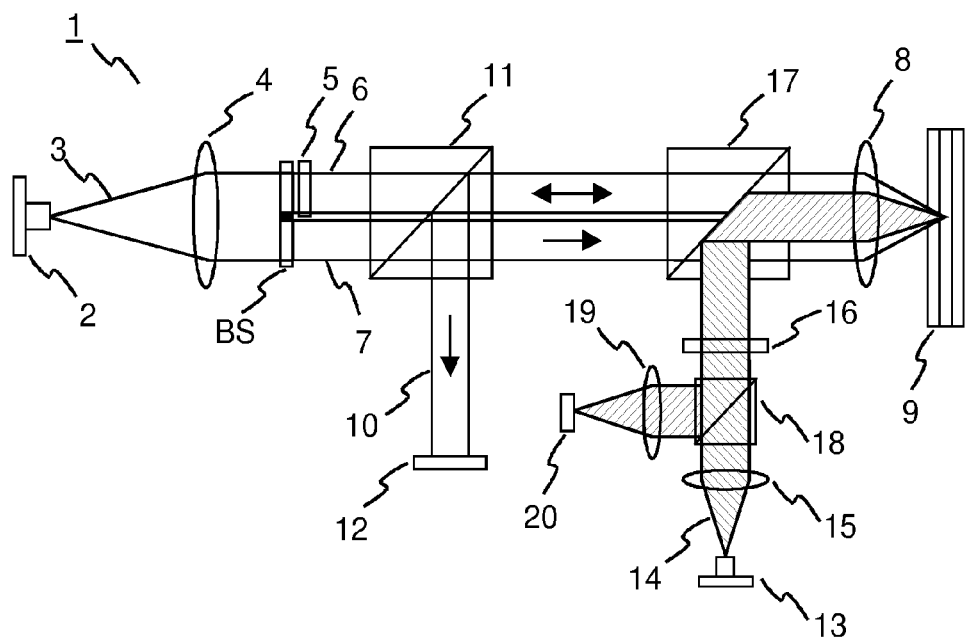
FIG. 1 schematically depicts a holographic pickup used in a holographic storage system.

In holographic data storage digital data are stored by recording the interference pattern produced by the superposition of two coherent laser beams. An exemplary setup of a holographic pickup 1 for use in a holographic storage system is shown in FIG. 1. A source of coherent light, e.g. a laser diode 2, emits a light beam 3, which is collimated by a collimating lens 4. The light beam 3 is then divided into two separate light beams 6, 7. In the example the division of the light beam 3 is achieved using a beam splitter BS. However, it is likewise possible to use other optical components for this purpose. A spatial light modulator (SLM) 5 modulates one of the two beams, the so called "object beam" 6, to imprint a 2-dimensional data pattern. Both the object beam 6 and the further beam, the so called "reference beam" 7, are focused into a holographic recording medium 9, e.g. a holographic disk, by an objective lens 8. At the intersection of the object beam 6 and the reference beam 7 an interference pattern appears, which is recorded in a photo-sensitive layer of the holographic recording medium 9.

The stored data are retrieved from the holographic recording medium 9 by illuminating a recorded hologram with the reference beam 7 only. The reference beam 7 is diffracted by the hologram structure and produces a copy of the original object beam 6, the reconstructed object beam 10. This reconstructed object beam 10 is collimated by the objective lens 8 and directed onto a 2-dimensional array detector 12, e.g. a CCD-array, by a first beam splitter 11. The array detector 12 allows to reconstruct the recorded data.

In order to simplify positioning of the object and reference beams 6, 7 relative to the holographic recording medium 9, the holographic recording medium 9 is provided with a servo layer. The holographic pickup 1 includes a further light source 13 for generating a servo light beam 14. The servo light beam 14 is collimated by a further collimating lens 15 and coupled into the beam path of the object and reference beams 6, 7 by a second beam splitter 17. The servo light beam 14 is then focused onto the servo layer by the objective lens 8. The light beam reflected by the servo layer is again collimated by the objective lens 8 and directed towards a detector 20 by the second beam splitter 17 and a third beam splitter 18. A lens 19 focuses the reflected light beam onto the detector 20. The servo light beam 14 advantageously has a different wavelength than the object and the reference beams 6, 7. In this case a wavelength selective beam splitter can be used as the second beam splitter 17. Preferably, the servo light beam 14 in addition is a linearly polarized light beam, which allows to implement the third beam splitter 18 as a polarization selective beam splitter. The path of the servo light beam 14 then includes a quarter wave plate 16 for rotating the direction of polarization of the reflected servo light beam 14 by 90 degrees relative to the direction of polarization of the servo light beam 14 emitted by the light source 13.

Figure 2:
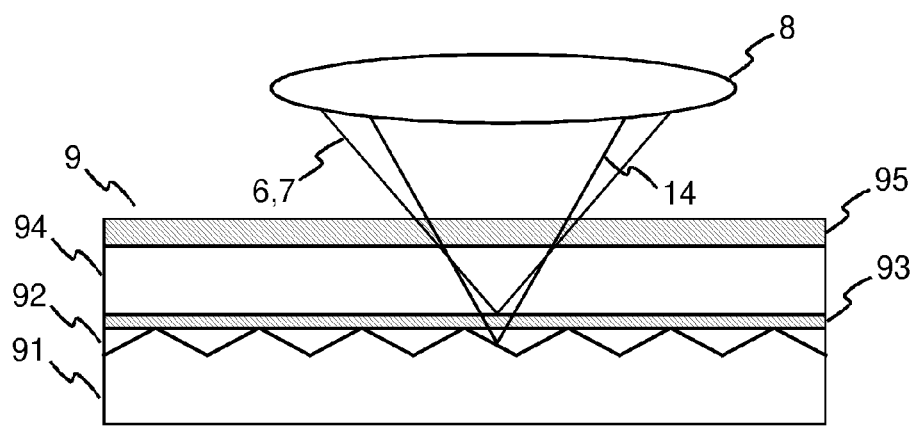
FIG. 2 shows a cross sectional view of a holographic recording medium according to the invention.

As described above, the servo light beam 14 is focused onto the holographic recording medium 9 with the same objective lens 8 as the light beams 6, 7 used for holographic recording. As the holographic light beams 6, 7 and the servo light beam 14 are fixed relatively to each other, the servo light beam 14 acts as a reference for the light beam 6, 7 used for holographic recording. Due to their different wavelengths and their different collimation the holographic light beams 6, 7 and the servo light beam 14 have different foci. A cross sectional view of the conditions inside the holographic recording medium 9 are shown in FIG. 2. The holographic recording medium 9 has a holographic layer 94 and a servo layer 92. The servo light beam 14 is focused onto a guiding structure of the servo layer 92, whereas the holographic light beams 6, 7 are focused into the holographic layer 94 as appropriate for the chosen holographic recording process. The servo layer 92 is arranged above a substrate 91 and separated from the holographic layer 94 by an intermediate layer 93, which is transparent for the wavelength of the servo light beam 14, but reflective for the wavelength of the holographic light beams 6, 7. Located above the holographic layer 94 is a cover layer 95. It is likewise possible to place the servo layer 92 above the holographic layer 94, separated by an adapted intermediate layer 93. In this case, however, the distortions of the holographic light beams 6, 7 caused by the servo layer 92 have to be compensated, e.g. by increasing the distance between the holographic layer 94 and the servo layer 92 such that the holographic beams 6, 7 have a comparatively large diameter when passing the servo layer 92.

According to the invention, the servo layer 92 is a recordable or rewritable layer. The servo layer 92 is not only used for precise focusing/tracking, but also for recording additional information, such as addressing information, hologram information (e.g. position, numbers of hologram per location, etc.), and content specific information. If the servo layer is a rewritable layer, the additional information can also be updated. Each time a hologram is recorded, one or several marks are written into the corresponding area of the servo layer 92. The servo layer 92 can then be used to detect the position of a hologram, since there will only be marks in the servo layer 92 where a hologram has been recorded. In addition, a code such a an RLL-code can be applied to the marks to encode the number of holograms, which are multiplexed at the same location, and the properties of each corresponding reference beam. Other information can likewise be encoded, e.g. tilt conditions of the holographic recording medium 9 during the recording process, etc. As the information of the servo layer 92 can be read faster than the data of the holograms, navigation on the holographic recording medium 9 becomes faster.

Figure 3:
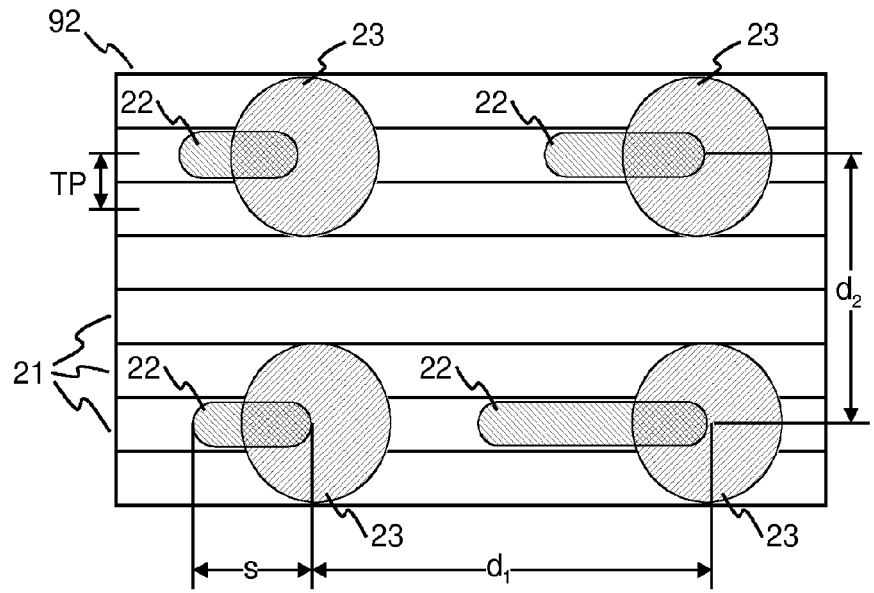
FIG. 3 depicts a first embodiment of the servo layer of the medium of FIG. 2 with holograms and servo marks (not to scale)
Figure 4:
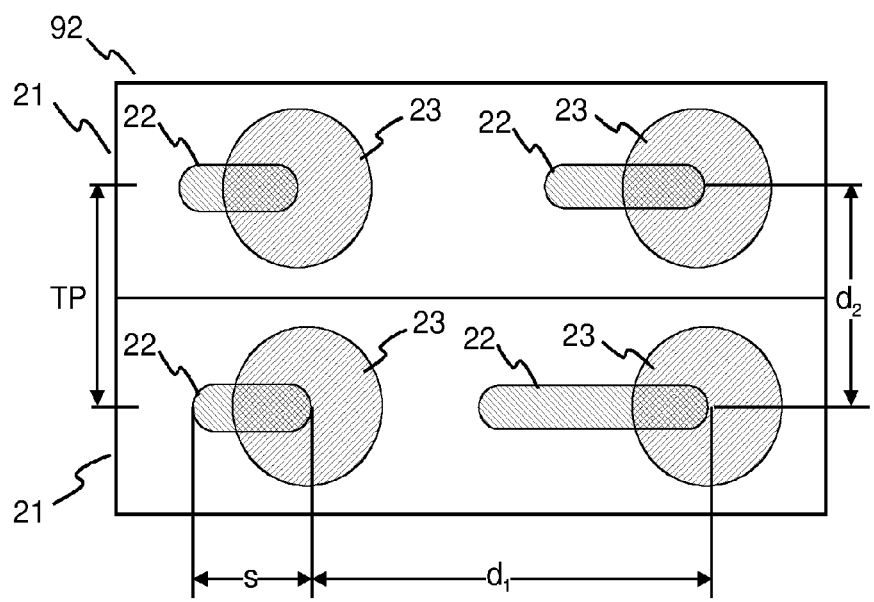
FIG. 4 depicts a second embodiment of the servo layer of the medium of FIG. 2 with holograms and servo marks (not to scale)
Figure 5:
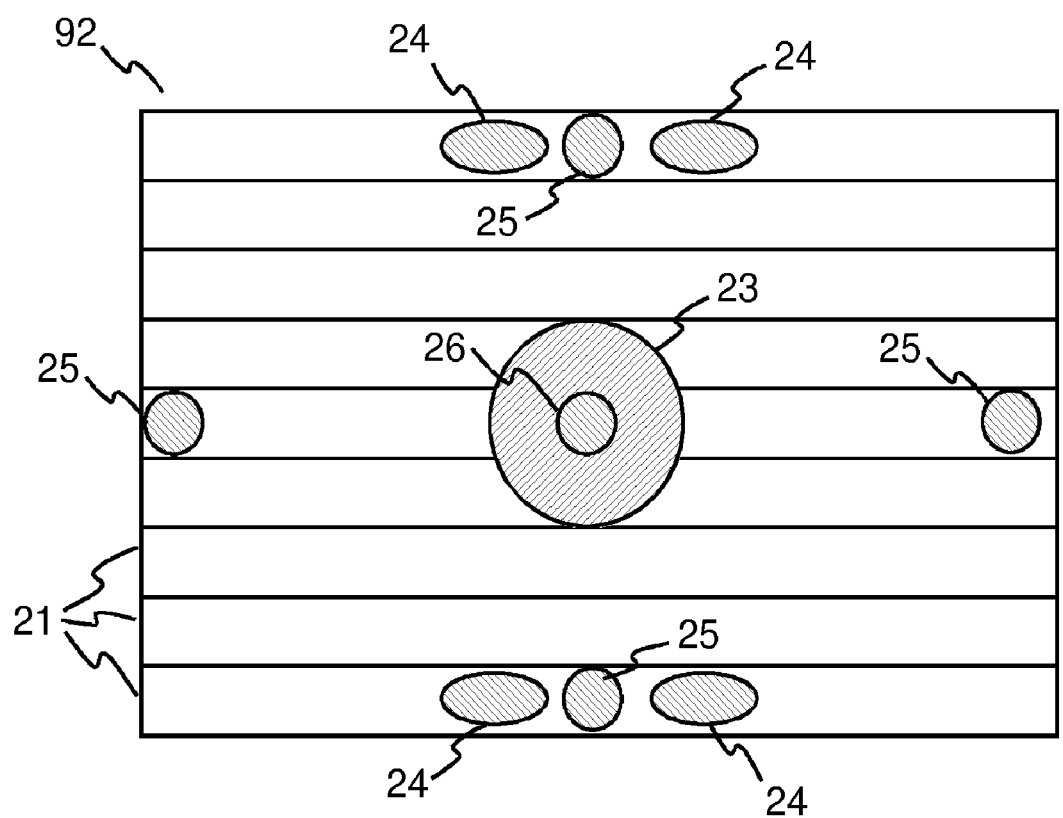
FIG. 5 shows a part of the holographic recording medium with holograms, tilt servo beams and additional servo marks (not to scale).

FIGS. 3 and 4 depict a first and a second embodiment of the servo layer 92 of the holographic recording medium 9 with holograms 23 and servo marks 22. The figures are not to scale. The servo layer 92 consists of tracks 21, e.g. grooves and lands, either with a track pitch (TP) smaller than the distance $d_2$ between adjacent holograms 23, as depicted in FIG. 3, or with a track pitch corresponding to the distance $d_2$ between adjacent holograms 23, as shown in FIG. 4. In the figures the adjacent holograms have different distances $d_1$, $d_2$ parallel and perpendicular to the tracks 21. Of course, the distances can likewise be identical. In case the holographic recording medium 9 is a holographic disk, the tracks 21 can be either concentric rings, or one spiral. When a hologram 23 is written into the holographic layer 94, additional information relevant for the hologram 23 is also written into the servo layer 92 in the form of marks 22 with different lengths s. This is preferably done by the servo light beam 14. When a second hologram 23 is recorded at the same position, the information in the servo layer 92 can be updated when a rewritable servo layer 92 is used. During readout, the information in the servo layer is used to position both the reference beam 7 and the servo light beam 14 relative to the holographic recording medium 9 to reliably retrieve the stored data. When the track pitch is smaller than the distance $d_2$ between the holograms, information can also be recorded in the adjacent tracks 21, where no holograms 23 are recorded. In addition, it is likewise feasible to record the additional data at a track position before the hologram position, e.g. in such way that the system has sufficient time to adapt to the specific hologram 23. As a tilt of the holographic recording medium 9 can significantly degrade the holographic readout performance, it is desirable to detect the amount of tilt. For this purpose the servo light beam 14 can be split into different partial beams 25 (side beams) and, where required, a main beam 26, as depicted in FIG. 5. If the holographic recording medium 9 is tilted, the partial beams 25 arrive at different times due to different path lengths introduced by the tilt. The time difference can be used to detect the tilt by measuring the phase difference between the partial beams 25. The side beams may be located on a track 21 with prerecorded or embossed features 24, which can be used to trigger a reading or writing process. Of course, the prerecorded or embossed features 24 can likewise be arranged such that they are detected by the main beam.

What is claimed is:

1. A holographic recording medium comprising:
   a holographic layer for storing holograms and a pre-grooved recordable or rewritable servo layer comprising tracks for positioning a light beam for reading or recording of a hologram relative to the holographic recording medium, wherein a track pitch of the tracks at a position of a hologram is smaller than a distance between adjacent holograms and the pre-grooved recordable or rewritable servo layer is provided for recoding additional data apart from holograms.

2. The holographic recording medium according to claim 1, wherein the holographic layer is essentially insensitive to light with the wavelength used for the pre-grooved recordable or rewritable servo layer.

3. The holographic recording medium according to claim 1, wherein the additional data are recorded in the pre-grooved recordable or rewritable servo layer in the form of data marks.

4. The holographic recording medium according to claim 1, wherein the pre-grooved recordable or rewritable servo layer comprises prerecorded marks for triggering reading and/or recording of a hologram.

5. A holographic pickup for a holographic storage system for use with the holographic recording medium according to claim 1, the holographic pickup comprising:
   first light source for generating at least a first light beam for reading a hologram recorded in the holographic recording medium,
   a second light source for generating a servo light beam, which interacts with tracks of a pre-grooved recordable or rewritable servo layer of the holographic recording medium for positioning the first light beam relative to the holographic recording medium, and
   a detector for retrieving a servo signal and additional data recorded in the tracks from a servo light beam reflected from the holographic recoding medium.

6. The holographic pickup according to claim 5, further comprising a third light source for recording additional data in the servo layer of the holographic recording medium.

7. The holographic pickup according to claim 5, further comprising means for generating a second light beam for recording a hologram in the holographic recording medium.

8. The holographic pickup according to claim 7, further comprising a controller for controlling the relative position of the servo light beam and the first or second light beam.

9. A holographic storage system comprising a holographic pickup for use with a holographic recording medium according to claim 1, wherein the holographic pickup comprises:
   a first light source for generating at least a first light beam for reading a hologram recorded in the holographic recording medium;
   a second light source for generating a servo light beam, which interacts with tracks of a pre-grooved recordable or rewritable servo layer of the holographic recording medium for positioning the first light beam relative to the holographic recording medium; and
   a detector for retrieving a servo signal and additional data recorded in the tracks from a servo light beam reflected from the holographic recording medium.

10. A method for recording data on a holographic recording medium comprising a holographic layer for storing holograms and a pre-grooved recordable or rewritable servo layer comprising tracks for positioning a light beam for reading or recording of a hologram relative to the holographic recording medium, wherein a track pitch of the tracks at a position of a hologram is smaller than a distance between adjacent holograms, the method comprising the step of writing additional data apart from holograms into the tracks.

11. A method for reading data from a holographic recording medium comprising a holographic layer for storing holograms and a pre-grooved recordable or rewritable servo layer comprising tracks for positioning a light beam for reading or recording of a hologram relative to the holographic recording medium, wherein a track pitch of the tracks at a position of a hologram is smaller than a distance between adjacent holograms, the method comprising the step of retrieving additional data apart from holograms from the tracks.

* * * * *